Figure 1:
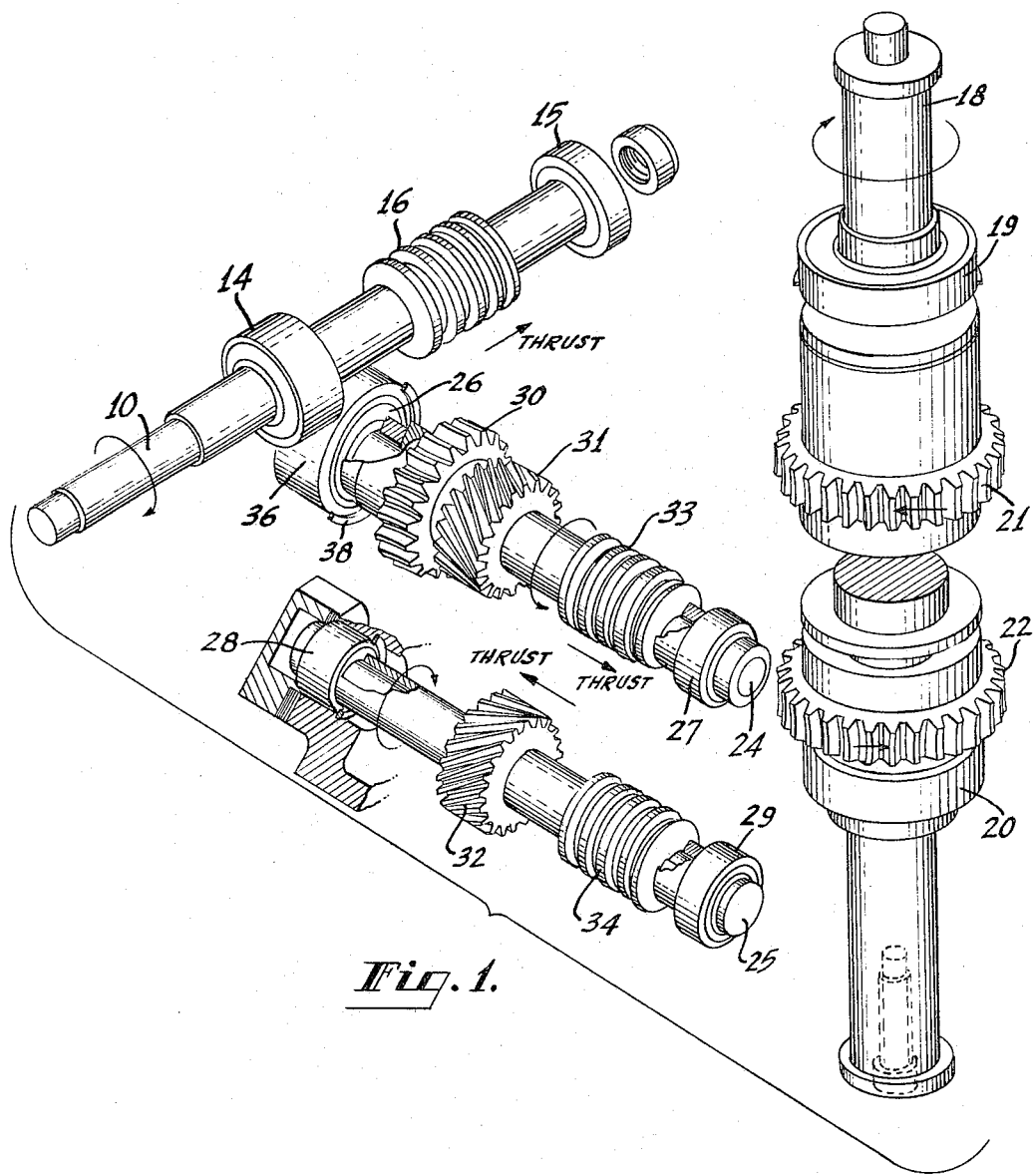

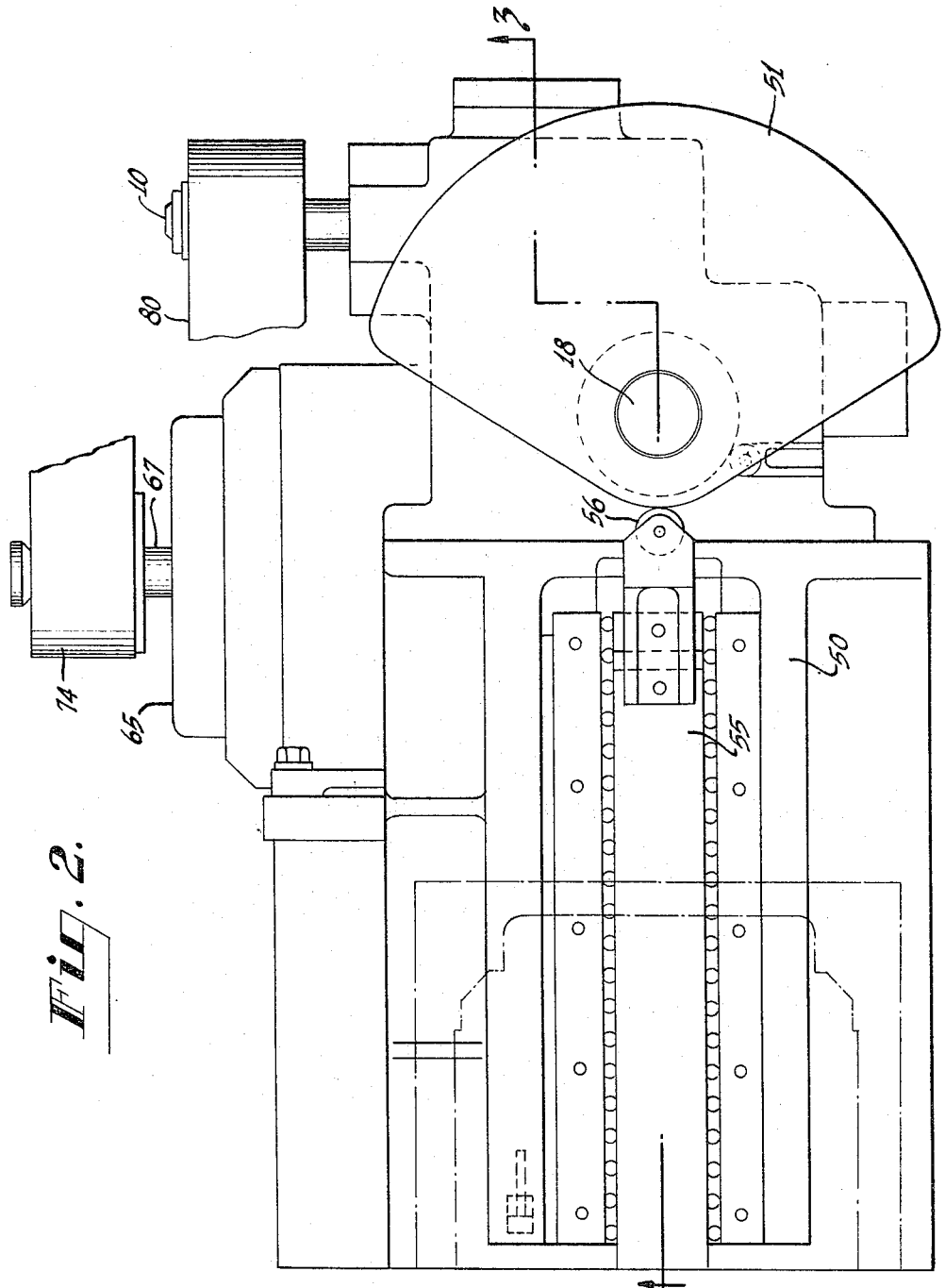

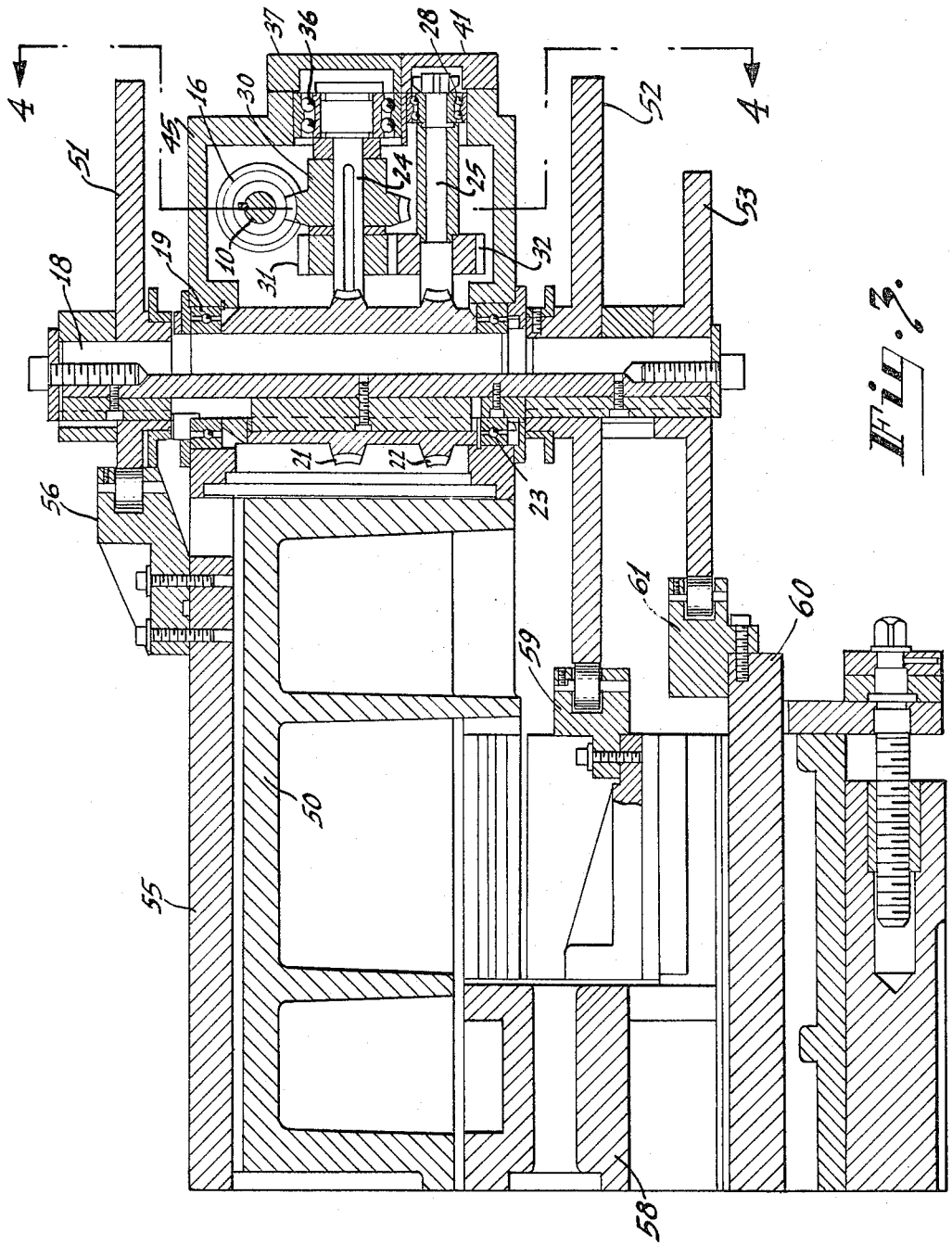

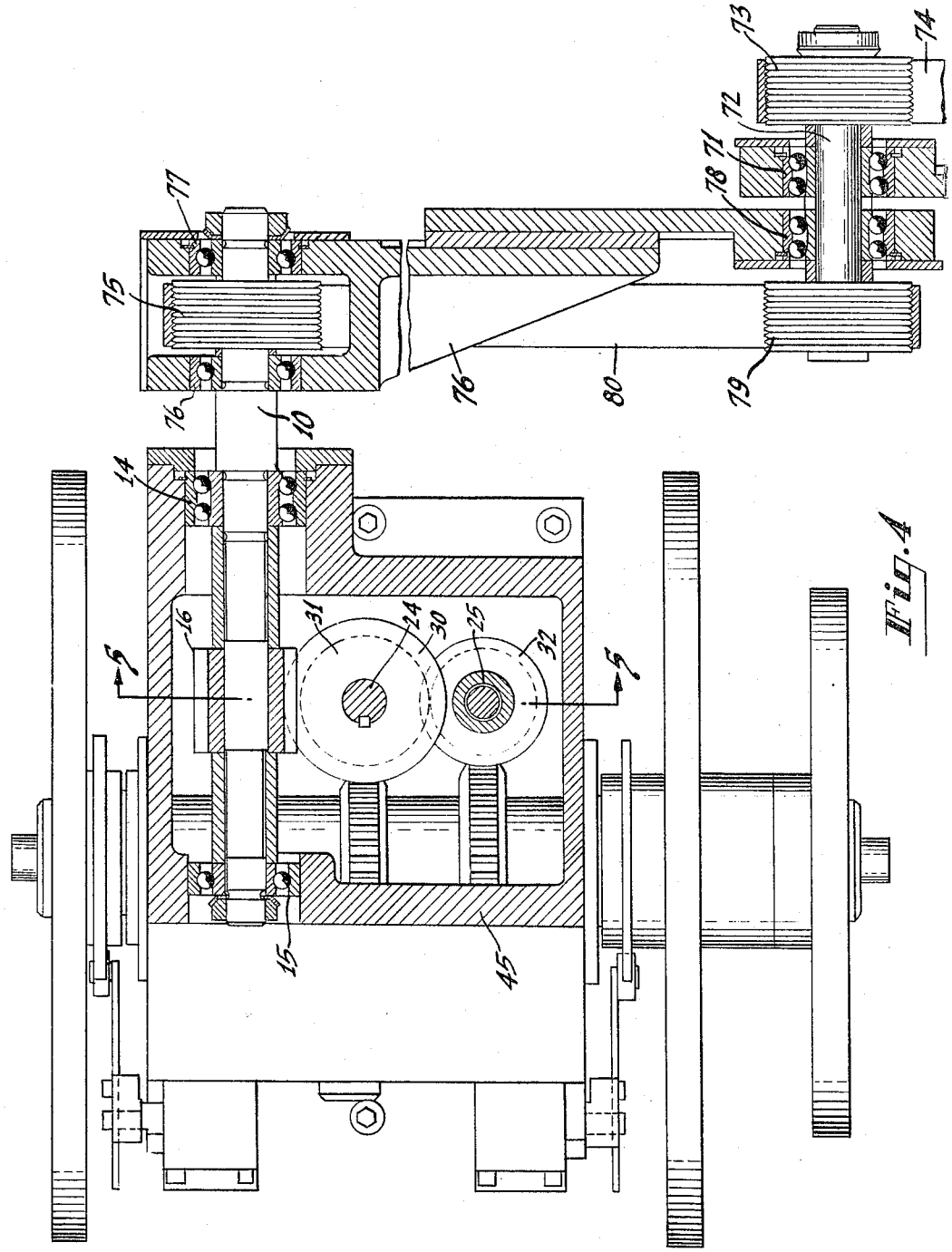

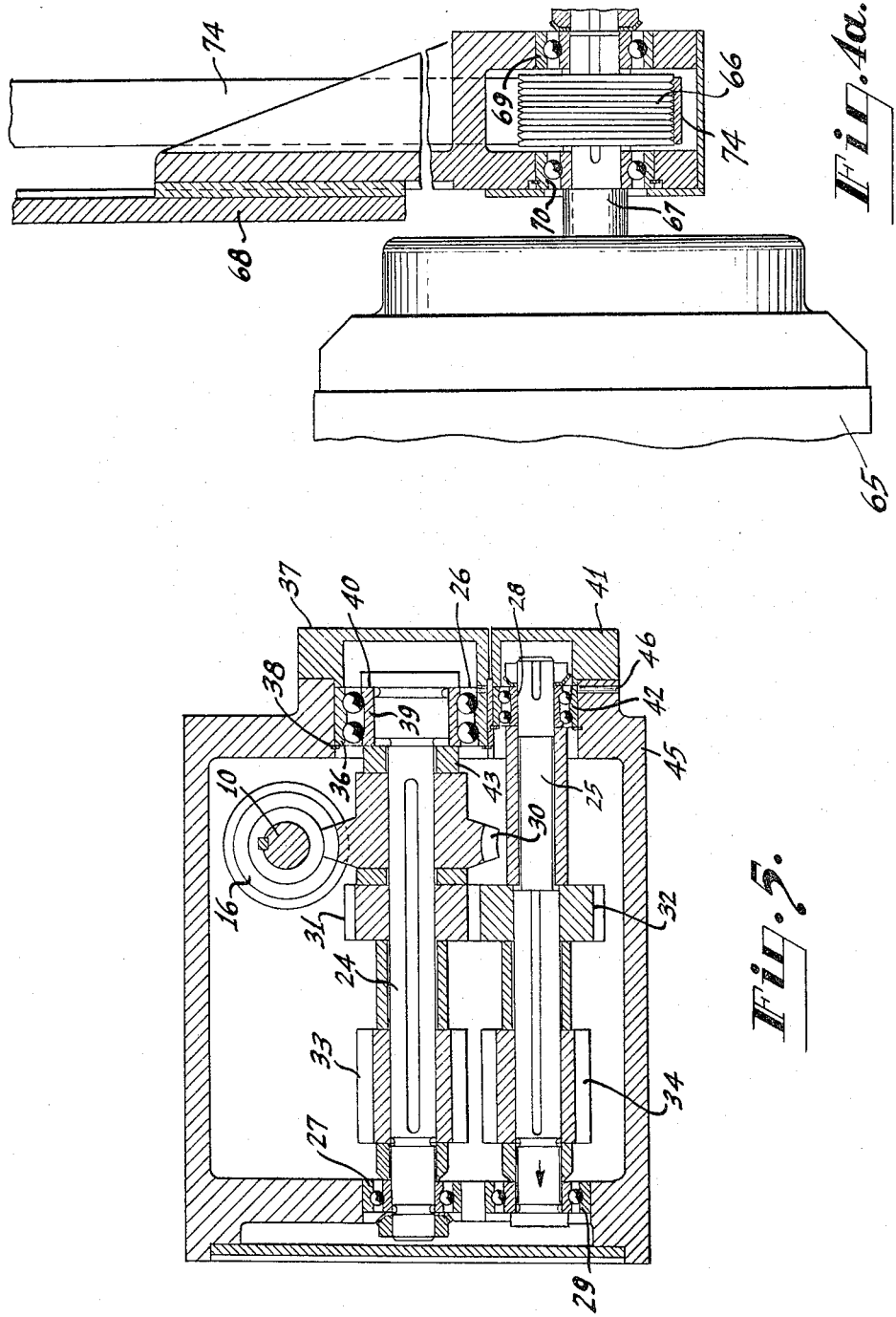

United States Patent Office 3,277,735
Patented Oct. 11, 1966

3,277,735
BACK LASH FREE POWER TRANSFER
MECHANISM
Nils Hoglund, Short Hills, N.J.
Filed Mar. 18, 1963, Ser. No. 265,978
The portion of the term of the patent subsequent to
Oct. 11, 1981, has been disclaimed
8 Claims. (Cl. 74—409)

My invention relates to apparatus for transferring power from a prime mover to another mechanism, more particularly to a gear train which eliminates back lash.

In certain types of apparatus, for example where a plurality of rotatable relatively fixed cams must be precisely rotated simultaneously to accurately operate a plurality of slides, for example which control the movement of a tool through a predetermined path and where accuracy is measured to ten thousandths of an inch or less, it is important that back lash in the driving mechanism or gear train connected to a prime mover be substantially eliminated.

In certain applications where the cams being rotated by a common shaft, for example, have sharp contours and where followers are biased against the cams, as the cams rotate, let us say in a clockwise rotation, a force may be exerted on the cam shaft by a cam in a counterclockwise direction up to a high point of the cam. When the high point is passed, the force on the shaft due to the biased follower will cause a force on the shaft in the opposite direction or in a clockwise direction as the shaft continues rotation. If any back lash is present in the gear train, obviously the cams will move faster than their prescribed rate of rotation after the high point is passed until the back lash is taken up. This could cause serious deviation in a tool path and inaccurate contours to be formed on a work piece.

It is therefore the principal object of my invention to provide a power transfer apparatus including a gear train mechanism in which back lash is substantially eliminated.

More particularly, it is an object of my invention to provide such a mechanism particularly suitable for insuring accurate rotation of a gear train driven drive shaft despite changes of direction of forces on the driven shaft.

Briefly, mechanism made according to my invention includes a driving shaft adapted to be connected to a prime mover and a driven shaft which provides the accurate rotation of the driven member or members. The driven shaft has a pair of spaced worm wheels fixed thereto. Connected between the driving and driven shafts are a pair of parallel shafts. These parallel shafts are coupled together by spiral gears to rotate in opposite directions. One of these which rotates in a clockwise direction for example has a worm wheel at one end coupled to a worm gear on the driving shaft. A second worm gear at the other end of the just mentioned shaft engages one of the worm wheels on the driven shaft. When the driving shaft rotates in a counterclockwise direction, the driven shaft is driven in a clockwise direction. The thread surface on the second worm gear engages the counterclockwise surface of the worm wheel on the driven shaft. The second parallel shaft is provided at one end with a worm gear which engages the second worm wheel on the driven shaft. The worm gear thread surface on the second parallel shaft is positioned to engage the clockwise surface of the second worm wheel on the driven shaft. The two parallel shafts rotate at the same speed but apply oppositely directed thrusts on the driven shaft. The worm gears are rigidly fixed axially so that as a result no back lash results. Adjustments can be made to take up for wear.

In the drawings, FIG. 1 is an exploded perspective of mechanism made according to my invention;
FIG. 2 is a partial plan view of apparatus employing the mechanism shown in FIG. 1;
FIG. 3 is a vertical section taken along the line 3—3 of FIG. 2;
FIG. 4 is a section taken along the line 4—4 of FIG. 3;
FIG. 4a is a section of an extension of part of FIG. 4;
FIG. 5 is a section along the line 5—5 of FIG. 4.

Referring to FIG. 1, the drive shaft 10 may be fixed for rotation in ball bearing assemblies 14 and 15. The worm gear 16 is fixed on the shaft 10. The driven shaft 18 is supported in ball bearing assemblies 19 and 20, and has fixed thereto the worm wheels 21 and 22 which will be referred to as the right hand and left hand worm wheels.

To transmit power and rotation to the driven shaft 18 from the shaft 10, I provide a pair of parallel shafts 24 and 25 suitably supported in ball bearing assemblies 26 and 27, and 28 and 29. The worm 16 on shaft 10 is meshed with the worm wheel 30 fixed to shaft 24 to cause rotation of the shaft 24 in the direction shown by the circular arrow.

Fixed to the shafts 24 and 25 are the spiral gears 31 and 32 which are meshed together, causing the shafts 24 and 25 to rotate in opposite directions as shown. Worms 33 and 34 are fixed to the shafts 24 and 25 and mesh with the worm wheels 21 and 22, respectively.

The shaft 24 is held from moving axially by means of the double row bearing 26 (FIGS. 1 and 5). The outer race 36 (FIGS. 1 and 5) is clamped between the retainer 37 and retainer ring 38. The inner ball race 39 is retained between the shoulder 40 on shaft 24 and the retaining ring 43. This arrangement assures that worm 33 is held rigidly axially relative to the driven shaft 18.

Shaft 25 is clamped rigidly to the bearing 28 and is free to move to the left (FIG. 5) into the gear housing 45, but is held from moving to the right or out of the housing by the retainer 41, which engages the outer race 42 of the bearing 28.

Between the retainer 41 and gear housing 45, I provide a laminated shim 46. Pressure is exerted by the retainer 41 on the outer race 42 of bearing 28, so that the worm 34 exerts a counterclockwise force in the worm wheel 22 which it engages. That is, the pressure is exerted on the clockwise side of a tooth on the worm wheel 22. Worm wheel 22 transmits this force to the shaft 18 to the other worm wheel 21, so that this last worm wheel will exert a force on the counterclockwise side of its tooth engaging worm 33. As this last worm is rigidly fixed axially, both worms together with the cam shaft will be rigidly locked together thus preventing back lash.

If back lash occurs as a result of wear in the worms or worm wheels, it can be compensated for by removing the retainer 41 and peeling off, for example, one-thousandth off the laminated shim 46. When the retainer is replaced, the shaft 25 will be forced one-thousandth of an inch in the direction of the arrow thus forcing all the gears involved in the back lash into contact as described above.

An application of my invention to a cam controlled mechanism where the problems described above are encountered is illustrated in FIGS. 2 to 5 inclusive.

Referring now to FIGS. 2 and 3, a cam shaft 18 is rotatably mounted by means of ball bearing assemblies 19 and 23 in a slide housing 50, which cam moves from left to right and in reverse as viewed in FIGS. 2 and 3. This housing may carry a slide arrangement for supporting a tool, neither of which is shown, since they have no direct bearing on the present invention. Cams 51, 52 and 53 are rigidly secured to the shaft 18. A slide 55 is mounted on slide housing 50 and is provided with a follower 56 contacting cam 57. Slide 55 is biased toward the cam 51, thus applying pressure between cam 51 and follower 56. The base support 58 on which the housing 50 is slidably supported is provided with a fixed follower 59 which contacts cam 52. Housing 50 is biased to the left. Thus, pressure is applied between cam 52 and follower 59. A slide 60 is mounted on the base 58 and is provided with a follower 61. All of the cams and followers are biased into contact with each other by means not shown. In operation as the cams rotate the housing 50 moves back and forth from right to left as do slides 55 and 60 to control movements of a tool slide assembly not shown. As described above, as the cam followers ride over high points in the cams, the forces exerted on the shaft 18 reverse. If any movement is permitted in the shaft 18 except movement in only the direction of rotation, errors in the counter of the work piece will result. This could happen if any back lash exists in the gear train mechanism connected between the prime mover and shaft 18.

In the apparatus shown power is delivered to shaft 18 through a gear train made according to my invention from the motor 65. The motor 65 is connected to the cam shaft 18 by means of a pivoted link drive which comprises the pulley 66 fixed to the shaft 67 of the motor 65. An arm 68 is pivotally mounted on the shaft 67 by ball bearing assemblies 69 and 70. At its opposite end a ball bearing support 71 supports a spindle 72 supporting a pulley 73 connected to pulley 66 by means of belt 74.

Mounted on the drive shaft 10 is the pulley 75. The arm 76 is pivotally mounted on shaft 10 by ball bearing assemblies 76–77. The spindle 72 extends through a ball bearing assembly 78 and supports pulley 79 thereon connected to pulley 75 by belt 80. Thus, slide housing 50 and gear housing 45 can move relatively to the fixed motor 65 since arms 68 and 76 are pivoted with respect to each other and to shafts 10 and 67.

What is claimed is:

1. A back lash free power transfer mechanism including a drive shaft, a pair of parallel shafts having meshed gears at one end thereof for rotating said shafts in opposite directions, and gearing means providing a coupling between said drive shaft and one of said parallel shafts, and a fourth shaft, said fourth shaft having a pair of gears fixed thereto, and other gears at the other ends of said parallel shafts and meshed with said pair of gears, one of said other gears being adapted to apply a force to said fourth shaft opposite force applied by the other of said other gears.

2. A back lash free power transfer mechanism including a drive shaft, a pair of parallel shafts having meshed helical gears at one end thereof for rotating said shafts in opposite directions, and gearing means providing a coupling between said drive shaft and one of said parallel shafts, and a driven shaft, said driven shaft having a pair of spaced gears fixed thereto, and worm gears at the other ends of said parallel shafts and meshed with said pair of spaced gears, one of said worm gears having a right-hand thread and the other of said worm gears a left-hand thread.

3. A back lash free power transfer mechanism including a drive shaft, a pair of parallel shafts having meshed helical gears at one end thereof for rotating said shafts in opposite directions, a worm and worm wheel providing a coupling between said drive shaft and one of said parallel shafts, a driven shaft, a pair of spaced worm wheels fixed to said driven shaft and oppositely disposed worms at the other ends of said parallel shafts and meshed with said worm wheels, one of said worms having a right-hand thread and the other of said worms a left-hand thread.

4. A back lash free power transfer mechanism including a drive shaft, a pair of parallel shafts having meshed helical gears at one end thereof for rotating said shafts in opposite directions, a worm and worm wheel providing a coupling between said drive shaft and one of said parallel shafts, a driven shaft, a pair of spaced worm wheels fixed to said driven shaft and oppositely disposed worms at the other ends of said parallel shafts and meshed with said worm wheels, one of said worms having a right-hand thread and the other of said worms a left-hand thread.

5. A back lash free power transfer mechanism including a drive shaft, a pair of parallel shafts having meshed helical gears at one end thereof for rotating said shafts in opposite directions, and gearing means providing a coupling between said drive shaft and one of said parallel shafts, and a driven shaft, said driven shaft having a pair of spaced gears fixed thereto, and worm gears at the other ends of said parallel shafts and meshed with said pair of spaced gears, one of said worm gears having a right-hand thread and the other of said worm gears a left-hand thread.

6. A back lash free power transfer mechanism including a drive shaft, a pair of parallel shafts having meshed gears at one end thereof for rotating said shafts in opposite directions, and gearing means providing a coupling between said drive shaft and one of said parallel shafts, a driven shaft, said driven shaft having a pair of spaced worm wheels fixed thereto, worm gears at the other ends of said parallel shafts and meshed with said worm wheels, one of said worm gears having a right-hand thread and the other of said worm gears a left-hand thread, one of said parallel shafts having means for biasing said one of said parallel shafts against its associated worm wheel to exert a force on said driven shaft in a direction opposite the force exerted on the other of said worm wheels on said driven shaft.

7. A back lash free power transfer mechanism including a drive shaft, a pair of parallel shafts having meshed gears at one end thereof for rotating said shafts in opposite directions and gearing means providing a coupling between said drive shaft and one of said parallel shafts, a driven shaft, said driven shaft having a pair of spaced worm wheels fixed thereto, worm gears at the other ends of said parallel shafts and meshed with said worm wheels, one of said worm gears having a right-hand thread and the other of said worm gears a left-hand thread, one of said parallel shafts having means for biasing said one of said parallel shafts against its associated worm wheel to exert a force on said driven shaft in a direction opposite force exerted on the other of said worm wheels on said driven shaft, and other means for providing an adjustment of the means for biasing said one of said parallel shafts.

8. A back lash free power transfer mechanism including a drive shaft, a pair of parallel shafts having meshed gears for rotating said shafts in opposite directions, gearing means coupling said drive shafts to one of said parallel shafts, a driven shaft, gear means on said driven shaft, and other gear means on said parallel shafts interengaged with said gear means on said driven shaft for applying forces in opposite directions on said driven shaft about the axis of rotation of said driven shaft while said driven shaft is rotated in one direction.

No references cited.

DON A. WAITE, *Primary Examiner.*